(12) United States Patent
Christoff et al.

(10) Patent No.: US 6,518,998 B1
(45) Date of Patent: Feb. 11, 2003

(54) IMAGE QUALITY BY AUTOMATICALLY CHANGING THE BLACK LEVEL OF A VIDEO SIGNAL

(75) Inventors: Jordan C. Christoff, Santa Barbara, CA (US); Douglas A. Golay, Coon Rapids, IA (US)

(73) Assignee: Integra Medical, Camarillo, CA (US)

( * ) Notice: Subject to any disclaimer, the term of this patent is extended or adjusted under 35 U.S.C. 154(b) by 0 days.

(21) Appl. No.: 09/094,232

(22) Filed: Jun. 9, 1998

(51) Int. Cl.[7] .......................... H04N 5/225; H04N 7/18; H04N 5/202; H04N 5/52; H04N 5/16
(52) U.S. Cl. .................. 348/216.1; 348/66; 348/69; 348/677; 348/678; 348/696
(58) Field of Search ................. 348/671, 677, 348/691, 678, 695, 696, 45, 46, 65, 66, 69, 216, 217, 229, 230, 255, 615, 216.1, 217.1, 229.1, 230.1

(56) References Cited

U.S. PATENT DOCUMENTS

| | | | | |
|---|---|---|---|---|
| 4,811,101 A | * | 3/1989 | Yagi | 348/691 |
| 4,831,437 A | * | 5/1989 | Nishioka et al. | 348/71 |
| 5,003,572 A | * | 3/1991 | Meccariello et al. | 378/98.7 |
| 5,047,861 A | * | 9/1991 | Houchin et al. | 348/247 |
| 5,379,075 A | * | 1/1995 | Nagasawa et al. | 348/691 |
| 5,410,365 A | * | 4/1995 | Nakamura et al. | 348/692 |
| 5,455,634 A | * | 10/1995 | Tamura et al. | 348/634 |
| 5,512,947 A | * | 4/1996 | Sawachi et al. | 348/243 |
| 5,594,468 A | * | 1/1997 | Marshall et al. | 345/158 |
| 5,708,482 A | * | 1/1998 | Takahashi et al. | 348/695 |
| 5,759,030 A | * | 6/1998 | Jung et al. | 433/29 |
| 5,880,826 A | * | 3/1999 | Jung et al. | 356/73 |
| 5,929,900 A | * | 7/1999 | Yamanaka et al. | 348/65 |
| 6,100,928 A | * | 8/2000 | Hata | 348/229 |
| 6,137,533 A | * | 10/2000 | Azim | 348/222 |
| 6,163,342 A | * | 12/2000 | Suzuki | 348/364 |

* cited by examiner

Primary Examiner—Wendy R. Garber
Assistant Examiner—John M. Villecco
(74) Attorney, Agent, or Firm—Blakely Sokoloff Taylor & Zafman LLP

(57) ABSTRACT

A video camera and imaging system having signal processing circuitry configured to change the black level (pedestal) of a video signal in response to comparing an overall system gain (for instance, a gain value and the electronic exposure time of the image sensor) to a threshold value. The change helps to automatically obtain brighter and more detailed images, particularly with imaging systems which are optimized for intraoral (dental) imaging but are also used to capture a headshot of the patent's smile or face.

19 Claims, 3 Drawing Sheets

IMAGE QUALITY BY AUTOMATICALLY CHANGING THE BLACK LEVEL OF A VIDEO SIGNAL

BACKGROUND INFORMATION

1. Field of the Invention

This invention is generally related to video imaging systems and more particularly to improving the quality of images captured with a camera having optics suitable for intraoral imaging.

2. Description of Related Art

Video cameras configured for intraoral operation are used for capturing images of the inside of a patient's mouth for diagnostic purposes and for patient education. To reduce camera manufacturing costs and complexity of operation, the optics in intraoral cameras typically have a fixed aperture. The aperture is optimized at a relatively small and fixed size for providing a suitable depth of field to obtain sharp images of inside the mouth without requiring a focusing mechanism.

A trade off for increased depth of field, however, is that the small aperture allows little light to reach the image sensor inside the camera. Consequently, intraoral cameras are typically equipped with a compact light source at the tip of the camera which is inserted into the patient's mouth. The light source sufficiently illuminates the scene inside of the mouth to allow the capture of bright, detailed images of the teeth and gums despite the small aperture.

A problem, however, arises when an intraoral camera with a fixed aperture is moved outside the mouth to capture a "headshot" or an image of the person's smile or face. Because the camera's optics and light source have been optimized for capturing images of close-up objects inside the mouth, images of scenes such as the patient's smile or face that are further away from the camera optics often appear dark and less detailed than those of inside of the mouth taken with the same camera.

The headshots can be improved manually by the user if the intraoral camera has an adjustable aperture and focus or if the video monitor has a brightness control feature. Adjustable optics, however, are costly and can also be inconvenient for use with an intraoral camera that is normally covered with an antiseptic sheath. Furthermore, making manual adjustments on either the camera or the monitor each time the camera is removed from and inserted back into the mouth is a significant inconvenience for both the patient and the dentist.

Therefore, it is desirable to have a video camera system that automatically allows brighter and clearer images of the patient's smile and face to be captured using a fixed-aperture intraoral camera.

SUMMARY

An embodiment of the invention is directed at a method of electronic imaging using a video camera having an imager for generating imager signals representing a number of images, by processing the imager signals into a video signal having a black level and automatically changing the black level in response to changes in the brightness of the images. In a particular embodiment, the camera further comprises intraoral imaging optics having a fixed aperture.

BRIEF DESCRIPTION OF THE DRAWINGS

The above briefly summarized features of an embodiment of the invention, as well as other features and advantages of other embodiments, will be apparent from the following detailed description, claims, and figures, where:

DETAILED DESCRIPTION

As summarized above, the invention in one embodiment allows a video camera system having a fixed and relatively small aperture, such as an intraoral camera having a light source at its distal end, to automatically capture brighter and clear images of the patient's smile and face. In a particular embodiment, the video camera system is configured to raise the black level of the video signal as the camera is removed from the patient's mouth to capture the headshot. The automatic change in the black level is done in response to reduced image brightness which, in this case, is due to the camera light source now being outside the patient's mouth and not sufficiently illuminating the patient's face.

Figure 1:
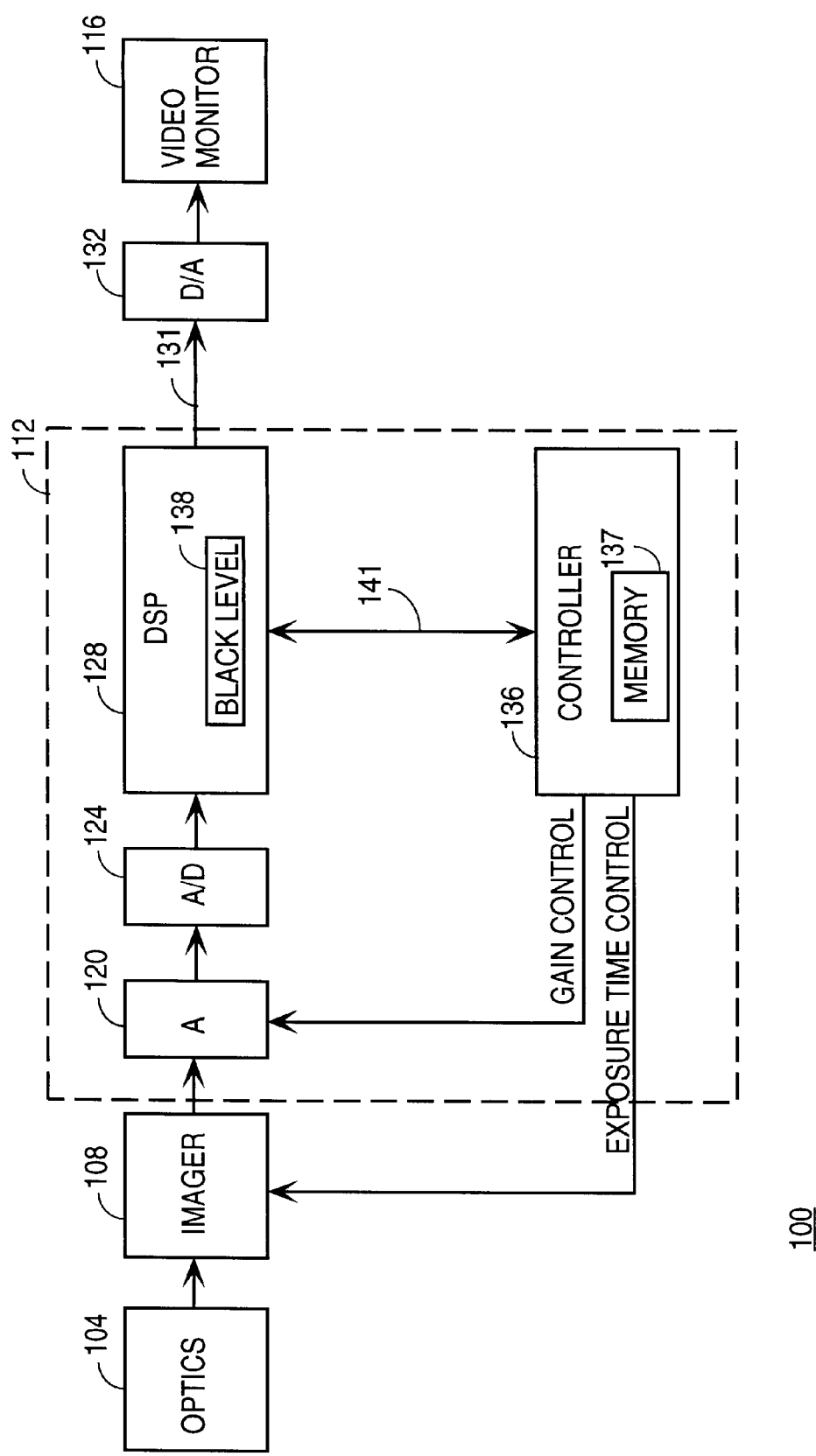
FIG. 1 is a functional block diagram of an imaging system according to an embodiment of the invention.

FIG. 1 illustrates in functional block diagram form an embodiment of the invention as an imaging system 100 with automatic black level adjustment. The system 100 comprises a camera with optics 104 configured for guiding light reflected from a scene onto an imager 108. The optics 104 may, in one embodiment, be configured with a relatively small and fixed aperture and a lens system suitable for capturing images of the inside of the mouth. Other optics arrangements may also be used, including those with an adjustable aperture and adjustable focus.

The imager 108 is coupled to the optics 104 and is configured to generate imager signals that represent a sequence of video images in response to the light reflected from a subject. The imager 108 can be one of a wide variety of different imagers suitable for video operation, such as those based on charge couple device (CCD) technology. With such imagers, each generated image in the sequence of video images is associated with at least one electronic exposure time. The exposure time helps determine the amount of incident energy that is detected by the imager. Exposure times may be adjusted as a function of, for instance, the lighting conditions of the scene to obtain acceptable quality images.

The imager signals are then fed to signal processing circuitry 112 which performs the automatic black level adjustment. The circuitry 112 together with the imager 108 may be viewed, in one embodiment, as a type of control system that continually adjusts the quality of a sequence of video images. The components of various embodiments of the circuitry 112 will be discussed below. From a functional standpoint, however, the signal processing circuitry 112 generates an exposure time and instructs the imager accordingly, adjusts the imager signals in accordance with a gain value, generates a brightness value representing the brightness of one of the images in the sequence, and processes the imager signals into one or more video signals 131 having a black level. In one embodiment, the adjustment in accordance with the gain value is an analog gain applied to each analog imager signal, where the imager signal represents in analog form the incident energy detected by a sensor element in the imager.

The black level (representing the black background of a displayed image) is sometimes referred to as the pedestal in video systems that comply with specifications set by the National Television Standards Committee (NTSC). The black level of the video signal 131 is automatically changed in response to the "system gain" having reached a predetermined threshold. The system gain represents, in one embodiment, a combination of an adjustment made to the imager signals (a gain being applied) and the electronic exposure time used to obtain the imager signals. This may be done in response to comparing the current gain value and the exposure time to respective threshold values.

Once its black level has been adjusted, the video signal 131 may then be converted into an analog video signal using a digital to analog (D/A) converter and used to drive a video monitor 116 to display the sequence of video images. The video monitor 116 may comprise a cathode ray tube (CRT), a liquid crystal display, or other means suitable for video imaging.

Figure 2:
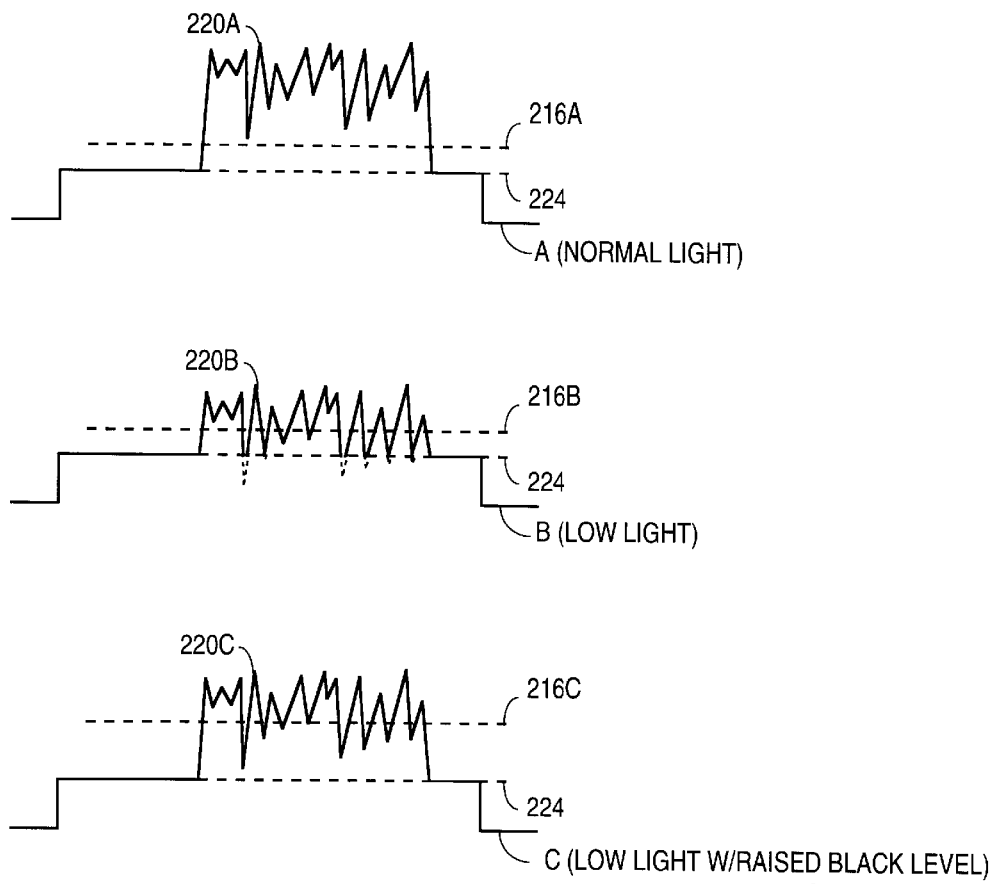
FIG. 2 shows several waveforms being analog video signals including one that has been corrected according to one embodiment of the invention.

FIG. 2 more clearly illustrates the effect of changing the black level using as an example three traces of analog video signals obtained by an intraoral camera. The analog video signal in each trace is associated with a black level 216, a blanking level 224, and active video information 220 which represents the video images that are displayed on the monitor 116. The black level 216 represents a reference level of a video signal, and the blanking level 224 represents a strongly black screen which is observed when the analog video signal at the blanking level 224 is driving the monitor 116.

Trace A represents an analog video signal that may be generated under normal conditions, e.g., while the intraoral camera is inside the patient's mouth illuminated by an intraoral camera light source. Trace A was obtained with the black level 216A being set to, for instance, 7.5 IRE (as per NTSC) above the blanking level 224. This is normally a suitable black level that gives acceptable image detail and brightness while the camera is inside the mouth, or under otherwise normal lighting conditions. Trace B is a signal generated under low light conditions, such as when taking a headshot with the same intraoral camera positioned outside the patient's mouth. Because the scene for trace B has relatively low light as compared to the scene for trace A, a significant amount of the active video information 220B is produced at a level closer to the blanking level 224. In some instances, some of the active video information 220B may in effect be clipped below the blanking level 224. Trace C shows the effect of raising the black level 216C above 7.5 IRE with respect to the blanking level 224. Raising the black level is in effect the same as adding a DC offset to the analog video signal without otherwise affecting the active video information. This results in both a brighter image and one with more detail as the portion of the signal representing the active video information 220C no longer falls below the blanking level 224.

Figure 4:
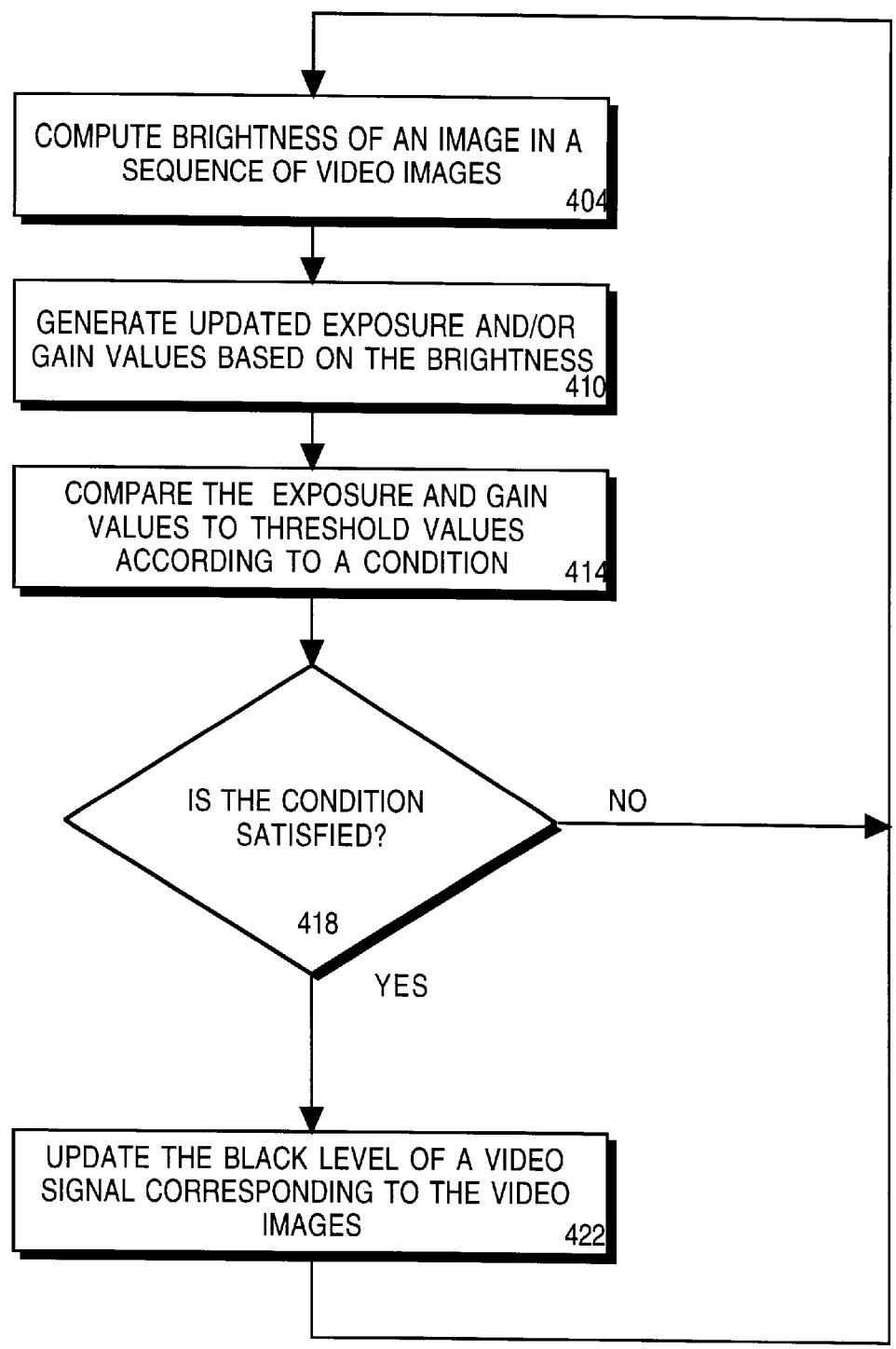
FIG. 4 is a flow diagram of steps performed according to an embodiment of the invention.

The black level may be automatically raised/lowered while the video images are being captured in response to both the gain value and the exposure time being larger/smaller than their respective threshold values. FIG. 4 illustrates a flow diagram of operations performed in one embodiment of the invention for automatically changing the black level. The gain value and the exposure time are normally continually adjusted during a video sequence, according to known techniques in the art, to maintain acceptable quality video images. In a particular embodiment of the invention, however, the gain value and the exposure time are computed in response to comparing a brightness value to a threshold, where the brightness value represents the brightness of each image in the sequence of video images being captured. Thus, in step 404, the brightness value is computed based on an average of pixel values from the image, a peak or anti-peak pixel value, or histogram data such as a number of pixels that are above or below a certain intensity. Operation then continues with step 410 of FIG. 4.

In step 410, the computed brightness value for an image is compared to a desired level, and then the exposure time and the gain to be applied to subsequent imager signals (representing subsequent images) may be generated as follows:

if(image_brightness>desired_level) then
{
  if (gain>gain_minimum) then
    gain=gain* (desired_level/image_brightness)
  else
    exposure=exposure* (desired_level/image_brightness)
}
else
{
  if (exposure<exposure_time_maximum) then
    exposure=exposure* (desired level/image brightness)
  else
    gain=gain* (desired_level/image_brightness)
}

The desired level of image brightness may be determined empirically based on human observation of displayed video images of a variety of different scenes and lighting conditions. The level may be set once and then fixed after the system 100 has been manufactured, or it may be changed by the user of the system 100 depending on the capabilities of the camera used (including the optics 104 and the imager 108) the lighting conditions, and the scenes to be imaged.

Figure 3:
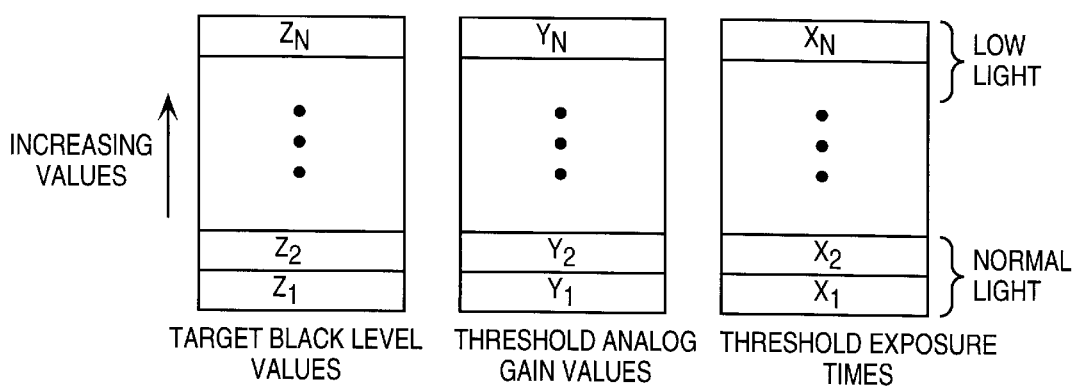
FIG. 3 shows a table of threshold analog gain and exposure times and corresponding target black level values that may be used in an embodiment of the invention.

Once the exposure time and gain values have been updated, the target black level is generated by first comparing the exposure time and the gain values against their respective threshold values according to a condition, as in indicated in step 414. In one embodiment, the exposure time and gain values are compared against a predefined table of threshold values such as those in FIG. 3. The threshold values may be determined empirically to give the best visual results for a particular camera and application. Operation then continues with step 418 where the condition is checked. If the condition is not met, then the black level is not changed, and operation may otherwise repeat with step 404 and subsequent images in the video sequence. On the other hand, if the condition is met, then operation continues with step 422 where the black level is updated. Operation may then continue with step 404 and with subsequent images. The routine below shows an exemplary comparison involving the exposure time and gain to generate a target (updated) black level. The routine uses a table as in FIG. 3:

for (i=1; i<=N, i++)
{
  if ((exposure>exposure_table[i]) and (gain>gain_table[i])) then
    black_level=black_level_table[i]
}

The updated exposure time and the gain values together with their corresponding target black level should be selected such that the displayed video images do not appear washed out (perhaps indicating the target black levels are too high) or too blurry and dark (indicating that the target black level may be too low) at a given set of exposure time and gain values. The threshold and target values $X_i$, $Y_i$, and $Z_i$ in FIG. 3 may be obtained through a trial and error procedure in which the imaging system 100 (see FIG. 1) is exposed to several different scenes. First, the gain and exposure values $X_1$ and $Y_1$ are computed (for instance, using the methodology described above) for a given scene and recorded. Different black levels are then applied until the displayed image is of acceptable quality, giving the target black level $Z_1$. The procedure is repeated for a range of scenes and lighting conditions using $X_2$, $Y_2$, ... $X_N$, $Y_N$ to obtain $Z_2$... $Z_N$. An indicated in the table of FIG. 3, the values will be generally increasing as the light level in the scene drops.

In one embodiment of the invention, the target black levels $Z_1$, $Z_2$, ... $Z_N$ are used to gradually brighten the images being displayed as the scene is changing. Alternatively, a more abrupt change in the brightness may be affected by having N=2 entries in the table of FIG. 3, one for scenes having normal light and one for scenes having low light.

The above described embodiments of the invention may be implemented using the imaging system 100 of FIG. 1. For instance, the signal processing circuitry 112 may comprise an automatic gain control (AGC) or amplifier (A) circuit 120 that amplifies imager signals from the imager 108 in analog form based on a control signal received from the controller 136. In this embodiment, the gain value determines the analog gain to be applied by the circuit 120 for adjusting the imager signals. Once adjusted according to the gain value, the analog signals are converted by analog to digital (A/D) converter 124 into digital signals representing image data. The image data is then accepted by the digital signal processing (DSP) circuit 128.

In one embodiment, the DSP 128 comprises an off-the-shelf digital signal processor such as the CXD2130R by Sony® Corp. specifically configured for use in color cameras having a CCD imager sensor. The DSP 128 further processes the image data, including perhaps the gathering of statistical information regarding the image and performing image correction and color space transformation, to generate a digital video signal 131 having a black level (also known as a pedestal level in video systems that comply with NTSC standards). The black level is set as a digital operation by the DSP 128, according to a digital value stored in a register 138.

In the embodiment of FIG. 1, the controller 136 includes a microcontroller that executes instructions in a memory 137 that cause it to communicate with the DSP 128 via, for instance, a serial interface bus 141. The memory 137 would also include instructions corresponding to the routines described above for generating the updated exposure time, gain value, and black levels. The target black level, in this embodiment, is written to the register 138 in the DSP 128 via the serial interface 141 between the DSP 128 and a microcontroller (not shown) in the controller 137. The controller 136 may also include dedicated logic circuitry that can generate the timing signals (including exposure timing) needed by the imager 108, and any other interface circuitry for controlling the Amplifier circuit 120. Thus, the controller 136 may be viewed as closing the loop of a control system for generating the video signal 131 having the proper black level in view of the current system gain setting.

Although the signal processing circuitry 112 is shown having a DSP circuit 112 and a separate controller 136, alternative embodiments may be an application specific integrated circuit (ASIC) having logic circuitry that may be mixed with analog circuitry to perform all or some of the functions shown in the signal processing circuitry 112 of FIG. 1.

To summarize, the embodiments of the invention described above are directed at a video camera and processing system that automatically adjusts the black level to accommodate images obtained under bright and dark conditions, particularly those obtained by intraoral cameras of the inside of the mouth and of the face of the patient. The system is configured to change the black level of the video signal in response to changing gain and exposure time values that are continually being updated in response to changing brightness values associated with the video images. For instance, the change in the black level of the image can be accomplished gradually by performing a comparison using each entry of the table of FIG. 3. Alternatively, the change in black level can be a large jump, giving a particularly distinctive effect on the monitor when the intraoral camera is removed from the patient's mouth to capture a headshot of the patient.

The embodiments of the invention are, of course, subject to some variations in structure and implementation. For instance, the change in black level implemented using the embodiment of FIG. 1 normally involves a digital operation performed by the DSP circuit 128. An alternative to that operation would be to provide analog level shifting circuitry coupled to the output of the D/A converter 132, where the analog circuitry adjusts the DC level of the analog video signal in response to a command from the controller 136. Also, instead of NTSC, the digital video signal 131 may comply with alternative standards, such as PAL or SECAM typically used in Europe and outside the U.S. In general, the scope of the invention should be determined not by the specific embodiments illustrated but by the appended claims and their legal equivalents.

What is claimed is:

1. A method of electronic imaging, comprising:

capturing a plurality of images using a video camera, the camera having an imager for generating imager signals in response to light;

processing the imager signals into a video signal having a black level; and automatically changing the black level in response to changes in one of an exposure time and a gain value exceeding their respective threshold values.

2. The method of claim 1 wherein the camera further includes intraoral imaging optics for guiding the light onto the imager.

3. The method of claim 1 wherein the camera further includes optics with a fixed aperture for guiding the light onto the imager.

4. An imaging system comprising optics;

imager coupled to the optics for generating imager signals representing a sequence of images in response to light guided by said optics and in accordance with an exposure time; and signal processing circuitry coupled to the imager and configured to adjust the imager signals in accordance with a gain value to obtain adjusted imager signals, process the adjusted imager signals into a video signal having a black level, generate the gain value and the exposure time, and automatically change the black level in response to comparing the gain value and the exposure time to respective threshold gain and exposure values.

5. The imaging system of claim 4 wherein the signal processing circuitry raises the black level in response to the gain value and the exposure time being larger than the respective threshold values.

6. The imaging system of claim 4 where the signal processing circuitry is further configured to generate a brightness value representing brightness of one of the images, and wherein the gain and exposure times are generated in response to comparing the brightness value to a brightness threshold value.

7. The imaging system of claim 6 wherein the brightness value is related to an average of pixel values from one of the images.

8. The imaging system of claim 4 wherein the signal processing circuitry maintains a table of threshold exposure times, threshold gain values, and target black level values, the exposure time and gain values being compared to respective threshold exposure and gain values in the table being associated with a target black level value used to change the black level.

9. The imaging system of claim 4 wherein the signal processing circuitry comprises
   amplifier circuit coupled to the imager for adjusting the imager signals in accordance with the gain value;
   analog to digital (A/D) converter coupled to the amplifier circuit for converting the imager signals into image data; and
   digital signal processing (DSP) circuitry coupled to the A/D converter for processing the image data to generate the video signal, the DSP circuitry having a register for storing a value representing the black level of the video signal; and
   controller coupled to the DSP circuitry and configured to automatically generate a target black level value and write the target black level value to the register for changing the black level.

10. The imaging system of claim 4 wherein the video signal is NTSC compliant.

11. The imaging system of claim 9 further comprising:
    digital to analog (D/A) converter coupled to the DSP circuitry for converting the video signal into an analog video signal; and
    display monitor coupled to the D/A converter for displaying the sequence of images in response to the analog video signal.

12. The imaging system of claim 4 wherein said signal processing circuitry is configured to process the adjusted imager signals by performing an A/D conversion upon the adjusted imager signals.

13. A method of electronic imaging, comprising:
    capturing a plurality of images using an imager for generating imager signals in response to light and in accordance with an exposure time;
    adjusting the imager signals in accordance with a gain value to obtain adjusted imager signals;
    processing the adjusted imager signals into a video signal having a black level; and
    automatically changing the black level in response to comparing the gain value and the exposure time to respective threshold gain and exposure values.

14. The method of claim 13 further comprising
    generating the exposure time and the gain value in response to measuring brightness of the images.

15. The method of claim 13 wherein the processing comprises:
    performing an A/D conversion upon the adjusted imager signals to obtain digital image data; and
    processing the image data into said video signal.

16. An article comprising:
    a machine-readable medium having instructions for being executed by a processor to cause the steps of:
    making a comparison between an image brightness value for an image, the image being one of a sequence of video images, and a brightness threshold value;
    generating one of an updated gain value and an updated exposure time based on the comparison; and
    generating an updated black level of a video signal corresponding to the sequence of video images in response to comparing the updated exposure time and the updated gain value to respective threshold values.

17. A method of electronic imaging for use at a position outside and inside a patient's mouth, comprising:
    adjusting a system gain based on a brightness value in a dental intra-oral imager system, wherein the system gain is a combination of an imager gain and an electronic exposure time;
    changing a black level from a first level to a second level in response to the system gain having changed substantially; and
    wherein the system gain changes substantially in response to moving a dental intra-oral camera from inside the patient's mouth to outside the patient's mouth, wherein the changing a black level comprises automatically increasing the black level in response to the system gain reaching a predetermined threshold as caused by the camera being moved to a position outside the patient's mouth suitable for capturing a head shot of the patient.

18. The method of claim 17 wherein the imager gain comprises an analog gain applied to an analog imager signal.

19. The method of claim 17 wherein the imager gain comprises a digital gain applied by a DSP circuit.

* * * * *